April 5, 1949.  A. SILFEN  2,466,489
FOWL KILLING DEVICE
Filed March 20, 1944
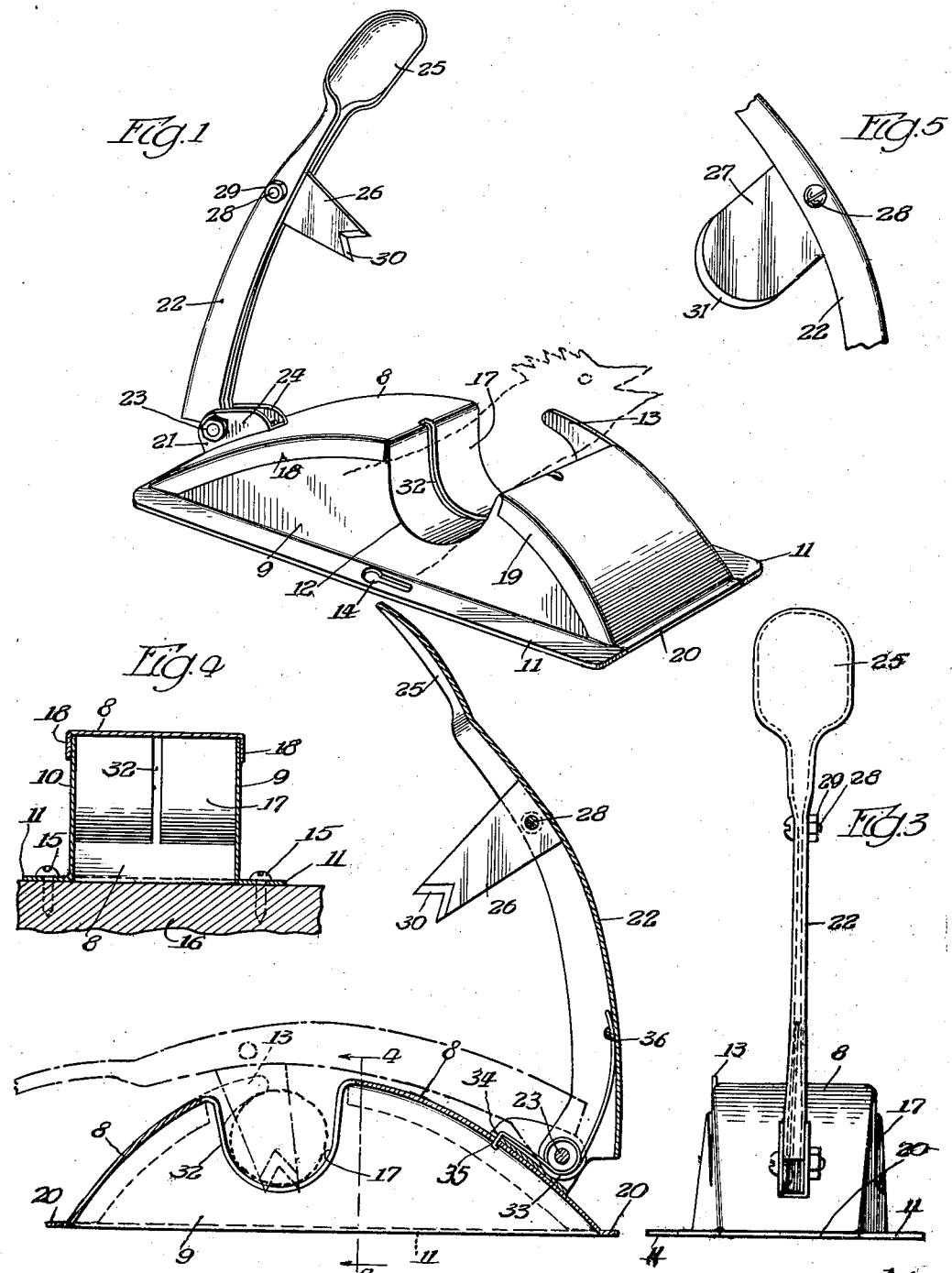
Inventor
Alfred Silfen
By Fred Gerlach Atty Patented Apr. 5, 1949

2,466,489

UNITED STATES PATENT OFFICE 2,466,489

FOWL KILLING DEVICE

Alfred Silfen, Berkeley, Ill., assignor to Dorothy Karlen Silfen, Berkeley, Ill.

Application March 20, 1944, Serial No. 527,213

5 Claims. (Cl. 17—12)

This invention relates in general to a fowl killing device, and is more particularly described as a device for killing poultry, and the like, by severing the spinal cord without decapitation and also as a decapitator.

An important object of the invention is to provide a block for receiving the neck of a fowl to be killed, and to provide interchangeable blades which may be used either to sever the spinal cord or to decapitate the fowl.

A further object of the invention is to provide a rigid hook or prong as a part of the holding block to retain the neck of the fowl in the recess of the block.

A still further object of the invention is to provide a metal block structure with a pivoted lever which is guided to and from engagement position, and has a blade receiving slot intermediate the ends for removably but firmly securing different blades in position.

A still further object of the invention is to provide a fowl killing device which is constructed of sheet metal, plastic, or other similar material, cut and shaped to proper form to provide a portable, light, strong and efficiently operating device.

Another object of the invention is to provide a fowl or poultry killer which is generally of new and improved construction, and is characterized by simplicity of design as well as ease and facility of assembly and also interchangeability of the cutting blades.

Other objects of the invention and various advantages and characteristics of the present fowl killing device will be apparent from a consideration of the following detailed description.

The invention consists in the several novel features which are hereinafter described and more particularly defined by the claims at the conclusion thereof.

In the drawings which accompany and form a part of this specification or disclosure and in which like letters and numerals of reference denote corresponding parts throughout the several views;

Figure 1 is a perspective view of a fowl killing device constructed in accordance with the present invention;

Figure 2 is a sectional view of the device shown in Figure 1;

Figure 3 is an end elevation of the structure shown in Figure 1;

Figure 4 is a sectional view taken on the line 4—4 of Figure 2; and

Figure 5 shows a decapitating blade which is substituted for the jugular severing blade as shown in Figure 1.

At times it may be desired to kill the fowl by severing the jugular vein or the spinal cord without removing the head or neck, and at other times, it may be desired to decapitate the fowl. The present invention provides a portable device preferably made of sheet metal, in which different blades may be interchanged for the different operations. It also provides a light, strong, easily operated device which is easily secured to and detached from any suitable support so that it is readily portable.

Referring now more particularly to the drawings, a head receiving block is formed of sheet metal, or similar material and comprises a top 8 and two sides 9 and 10 shaped and secured together to provide a lower flat supporting base and an upwardly rounded block projection.

Each side member 9 and 10 has a flat base portion 11 bent at right angles to the side and formed with a curved upper edge having a rounded notch 12 therein. In the notch of one side 10 is a projecting hook-like prong 13, and in the base portion 11 of each side member is a keyhole slot 14 for making a quick detachable connection by means of screws 15 with a suitable fixed or movable support 16.

The top piece 8 is curved lengthwise to fit the curved edges of the sides 9 and 10 and has a curved groove or recess 17 conforming to the notches 12 in the upper edges of the sides 9 and 10 so that it is seated closely therein and forms a transverse recess for receiving the neck of the fowl therein. The marginal edges 18 and 19 of the top are bent downwardly over the upper curved edges of the sides 9 and 10 and are permanently secured thereto by spotwelding or in any other suitable manner. At the ends of the top are flange portions 20 which are similarly secured to the flat portions 11 of the bases of the sides for additionally holding the parts together.

Secured to the upper surface of the top adjacent one end thereof is a bracket 21, U-shaped in cross section, in which a lever 22 is rotatable upon a pivot bolt 23. The lever is preferably formed of sheet metal bent substantially to a U-shaped cross section and is mounted to fit closely in the bracket and to engage forwardly extending sides 24 which form a guide for holding the lever accurately in place during its raising and lowering movements.

At the outer end of the lever is a flat, wider hand-gripping extremity 25, and intermediate the ends, the sides are spaced apart to receive either of two cutting blades 26 and 27 which are held tightly between the sides of the lever and against the transverse connecting web by means of a fastening bolt 28 and its nut 29. One of the blades 26 may be comparatively narrow having a cutting edge 30 adapted to sever the spinal cord or the jugular vein of a fowl without cutting off the neck or head, and the other blade 27 may be comparatively wider with a cutting edge 31 adapted to substantially fill the recess 17 and to completely sever the neck of a fowl, removing the head thereof.

In the recess 17 and extending longitudinally of the top is a slot 32 adapted to receive the extremities of the cutting edges 30 and 31 of the blades so that a clean cutting or severing operation will be performed.

In order to raise the lever from a depressed position, a coil spring 33 is wound about the pivoting bolt 23 and has one end 34 hooked through an opening 35 in the top plate 8, and the other end 36 bearing against the lever at a distance from the pivot within the cross section of the lever. This spring is so arranged and proportioned that sufficient tension is added to the spring when the lever is depressed to raise the lever out of the recess 17 and into an upright position, but not overturning it so that the pointed end of the blade is uppermost.

With this construction, either blade 26 or 27 may be quickly and easily inserted within the lever depending upon the service which is to be performed. The head of a chicken or other fowl is inserted in the recess under the hooked prong 13 if desired, to keep the neck more firmly in position, and the lever is moved downwardly engaging the blade with the neck of the fowl, pressing down on the handle portion 25 of the lever until the cutting edge of the blade enters the slot 32, thus making a clean cut or decapitation of the fowl.

By making the device entirely of metal or similar material, it is both light and inexpensive, it may be easily removed or applied to a fixed support by means of a pair of screws or similar fastening devices, and since it is so easily removed, it may be carried from one place to the other, or to facilitate cleaning thereof.

This invention is not to be understood as restricted to the details set forth since these may be modified within the scope of the appended claims without departing from the spirit and scope of the invention.

Having thus described the invention, what I claim as new and desire to secure by Letters Patent is:

1. A fowl killer, comprising a block having a transverse top surface with an upwardly opening rounded recess for receiving the neck of a fowl, a lever pivoted on the block at a distance from the recess, a projection at one side of the block extending partially over the recess to engage the neck of a fowl therein and a narrow blade carried by the lever and movable thereby into the recess to sever the spinal cord or the jugular vein of a fowl without decapitating it.

2. A fowl killer, comprising a block having a transverse top plate formed with a rounded recess for receiving the neck of the fowl, with a hook shaped prong at one end of the recess to engage the neck of the fowl therein, and a lever pivoted on the block at a distance from the recess, having a blade movable therewith into the recess to engage the neck of a fowl therein.

3. A fowl killer, comprising a block of sheet material having a top plate formed with a recess for receiving the neck of a fowl, a sheet metal prong in the form of a hook extending partly over the recess at one side thereof to assist in retaining the neck of the fowl in the recess, and a lever pivoted at one end of the block having a blade movable into the recess to engage the neck of a fowl therein.

4. A fowl killer comprising a block formed of sheet material having opposite side plates formed with upper curved edges having corresponding notches therein and with base flanges in a common plane, a top plate curved to fit the upper edges of the sides and with a transverse recess to fit in the notches of the side plates, the top and side plates being secured rigidly together, and a lever pivoted on the top plate at a distance from the recess having a blade carried thereby and movable into the recess.

5. A fowl killer comprising a portable block made of sheet metal having opposite side members with curved upper edges and corresponding notches therein and having extending bottom flanges, a curved top plate with a transverse recess fitting into the notches and having downwardly bent side edges and end flanges secured to the sides and flanges of the side members for securing them all together, and a lever pivoted on the top piece having a blade carried by the lever and movable into the recess, the flanges of the side members having keyhole slots for releasably securing the block to a fixed support.

ALFRED SILFEN.

REFERENCES CITED

The following references are of record in the file of this patent:

UNITED STATES PATENTS

| Number | Name | Date |
|---|---|---|
| 368,403 | Lamb | Aug. 16, 1887 |
| 1,580,790 | MacAllister | Apr. 13, 1926 |
| 1,783,699 | Butcher | Dec. 2, 1930 |
| 1,796,212 | Nadeo | Mar. 10, 1931 |

FOREIGN PATENTS

| Number | Country | Date |
|---|---|---|
| 444,296 | France | Aug. 3, 1912 |